US010611193B2

United States Patent
Kato

(10) Patent No.: US 10,611,193 B2
(45) Date of Patent: Apr. 7, 2020

(54) PNEUMATIC TIRE

(71) Applicant: BRIDGESTONE CORPORATION, Tokyo (JP)

(72) Inventor: Keiichi Kato, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 294 days.

(21) Appl. No.: 15/314,903

(22) PCT Filed: Mar. 19, 2015

(86) PCT No.: PCT/JP2015/001556
§ 371 (c)(1),
(2) Date: Nov. 29, 2016

(87) PCT Pub. No.: WO2015/182024
PCT Pub. Date: Dec. 3, 2015

(65) Prior Publication Data
US 2017/0190221 A1     Jul. 6, 2017

(30) Foreign Application Priority Data
May 30, 2014   (JP) ................................. 2014-112876

(51) Int. Cl.
*B60C 11/12* (2006.01)
*B60C 11/03* (2006.01)
(Continued)

(52) U.S. Cl.
CPC .............. *B60C 11/12* (2013.01); *B60C 11/03* (2013.01); *B60C 11/0306* (2013.01);
(Continued)

(58) Field of Classification Search
CPC ............. B60C 11/1376; B60C 11/1384; B60C 11/1392; B60C 11/03; B60C 11/12;
(Continued)

(56) References Cited

U.S. PATENT DOCUMENTS 5,837,074 A * 11/1998 Uemura ............... B60C 11/0302
152/209.18
2008/0142133 A1* 6/2008 Ochi ....................... B60C 11/13
152/209.8
(Continued)

FOREIGN PATENT DOCUMENTS

AU          567351 B2 * 11/1987 ......... B60C 11/0306
CN      102756619 A    10/2012
(Continued)

OTHER PUBLICATIONS

Machine translation of JP2003-326920 (no date).*
Machine translation of JP2001-071709 (no date).*
May 12, 2015 International Search Report issued in International Patent Application No. PCT/JP2015/001556.

*Primary Examiner* — Steven D Maki
*Assistant Examiner* — Philip N Schwartz
(74) *Attorney, Agent, or Firm* — Oliff PLC

(57) ABSTRACT

A pneumatic tire provided with, in a tread surface, at least two main circumferential grooves, and a first land portion defined by the two main grooves, wherein in the first land portion, the followings are disposed: a first inclined groove; inclining relative to a tire width direction, and having one end portion opening in the main groove on one side adjacent to the first land portion and the other end portion terminating within the first land portion, and a first notched portion; having one end in a tire width direction as a tip positioned at an endmost, in a tire width direction, of the other end portion of the first inclined groove and the other end in a tire width direction opening in the main groove on the other side adjacent to the first land portion.

10 Claims, 2 Drawing Sheets

(51) Int. Cl.
*B60C 11/13* (2006.01)
*B60C 11/04* (2006.01)

(52) U.S. Cl.
CPC .......... *B60C 11/04* (2013.01); *B60C 11/1392* (2013.01); *B60C 2011/0341* (2013.01); *B60C 2011/0344* (2013.01); *B60C 2011/0365* (2013.01); *B60C 2011/0367* (2013.01); *B60C 2011/0372* (2013.01); *B60C 2011/0383* (2013.01); *B60C 2011/0386* (2013.01); *B60C 2011/129* (2013.01); *B60C 2011/1209* (2013.01)

(58) Field of Classification Search
CPC ................ B60C 11/04; B60C 11/0306; B60C 2011/1209; B60C 2011/0365; B60C 2011/129; B60C 2011/0344; B60C 2011/0372; B60C 2011/0341; B60C 2011/0367; B60C 2011/0386; B60C 2011/0383
See application file for complete search history.

(56) References Cited

U.S. PATENT DOCUMENTS

| | | | | |
|---|---|---|---|---|
| 2009/0320982 A1* | 12/2009 | Ochi | .................. | B60C 11/0306 152/209.25 |
| 2013/0146190 A1* | 6/2013 | Aoki | .................. | B60C 11/0306 152/209.18 |

FOREIGN PATENT DOCUMENTS

| | | | | |
|---|---|---|---|---|
| CN | 103182905 A | | 7/2013 | |
| CN | 204712798 U | | 10/2015 | |
| EP | 1 964 691 A1 | | 9/2008 | |
| JP | 2001071709 A | * | 3/2001 | ......... B60C 11/1369 |
| JP | 2003-182315 A | | 7/2003 | |
| JP | 2003326920 A | * | 11/2003 | ......... B60C 11/1384 |
| JP | 2005-053365 A | | 3/2005 | |
| JP | 2008-174197 A | | 7/2008 | |
| JP | 2010-167857 A | | 8/2010 | |
| JP | 2011-194987 A | | 10/2011 | |
| WO | 2013/088717 A1 | | 6/2013 | |

\* cited by examiner a-a' cross section b-b' cross section

PNEUMATIC TIRE

TECHNICAL FIELD

The disclosure relates to a pneumatic tire.

BACKGROUND

Conventionally, a variety of pneumatic tires provided with, in the tread surface, at least two main grooves continuously extending in the tire circumferential direction and a rib-like land portion defined by the two main grooves, and having a groove extending in the tire width direction disposed in the rib-like land portion, have been proposed. For example, for the purpose of simultaneously improving wet performance including drainage performance and wet steering stability, and uneven wear resistance, JP2011194987A (PTL1) proposes a pneumatic tire where inclined lug grooves and sipes are disposed in a rib-like land portion, the inclined lug grooves inclining relative to the tire circumferential direction and extending in the tire width direction, and having one end opening in the main groove and the other end terminating within the land portion, and the sipes inclining and extending in the opposite direction to the inclination in the tire circumferential direction of the inclined lug groove, and having one end opening in the middle of the inclined lug groove and the other end terminating within the land portion.

CITATION LIST

Patent Literature

PTL 1: JP2011194987A

SUMMARY

Technical Problem

With such conventional tire, although wet performance and uneven wear could be improved, there have been needs for further improvement in steering stability and drainage performance.

It could therefore be helpful to provide a pneumatic tire that can improve steering stability and drainage performance.

Solution to Problem

The pneumatic tire disclosed herein is a pneumatic tire provided with, in a tread surface, at least two main grooves continuously extending in a tire circumferential direction, and a first land portion defined by the two main grooves, wherein in the first land portion, a first inclined groove is disposed, the first inclined groove inclining relative to a tire width direction, and having one end portion opening in the main groove on one side adjacent to the first land portion and the other end portion terminating within the first land portion, and further in the first land portion, a first notched portion is disposed, the first notched portion having one end in a tire width direction as a tip positioned at an endmost, in a tire width direction, of the other end portion of the first inclined groove and the other end in a tire width direction opening in the main groove on the other side adjacent to the first land portion.

According to the pneumatic tire disclosed herein, it is possible to improve steering stability and drainage performance.

In the pneumatic tire disclosed herein, it is preferable that in the first notched portion, a length measured along a tire circumferential direction gradually increases from the one end of the first notched portion toward the other end thereof. With this structure, it is possible to improve drainage performance while suppressing the decrease in rigidity of the land portion at the first notched portion.

In the pneumatic tire disclosed herein, it is preferable that a groove width of the first inclined groove gradually increases from a side of the one end portion of the first inclined groove toward a side of the other end portion thereof. With this structure, it is possible to further improve steering stability or drainage performance.

In the pneumatic tire disclosed herein, it is preferable that, in the first inclined groove, inclination of the first inclined groove relative to a tire width direction is curved in a manner that it gradually decreases from a side of the one end portion of the first inclined groove toward a side of the other end portion thereof. With this structure, it is possible to further improve drainage performance.

In the pneumatic tire disclosed herein, it is preferable that the first land portion is provided with a first sipe in which one end opens in the first inclined groove and the other end opens in a main groove on the other side, and the first sipe is constituted by a first sipe portion and a second sipe portion, the sipe portions having different angles extending relative to a tire circumferential direction and being connected with each other. With this structure, it is possible to improve wear resistance performance and wet performance (braking performance when running on wet road surface).

As used herein, "sipe" refers to a groove which closes under contacting conditions where a tire mounted on an applicable rim is filled with a predetermined air pressure and applied with a load corresponding to the maximum load capability and opens within the contact patch under an unloaded condition where a tire mounted on an applicable rim is filled with a predetermined air pressure. The aforementioned "applicable rim" refers to a standard rim in an applicable size (such as Measuring Rim in STANDARDS MANUAL of ETRTO, Design Rim in YEAR BOOK of TRA) described in industrial standards effective in a region where the tire is manufactured and used, for example, JATMA YEAR BOOK published by the Japan Automobile Tire Manufacturers Association, Inc. (JATMA) in Japan, in STANDARDS MANUAL of the European Tire and Rim Technological Organization (ETRTO) in Europe, and in YEAR BOOK of the Tire and Rim Association, Inc. (TRA) in the US. Further, a condition where "a tire mounted on an applicable rim is filled with a predetermined air pressure" refers to a condition in which the tire is mounted on the above applicable rim and filled to reach the air pressure (maximum air pressure) corresponding to the maximum load capability for a single wheel of the applicable size/ply rating described by JATMA or the like. The "maximum load capability" is the maximum mass permitted to be loaded on the tire in the standard. Further, air mentioned herein can be substituted with an inactive gas such as nitrogen gas and the like.

In the pneumatic tire disclosed herein, it is preferable that directions in which the first sipe extends are opposite in a tire circumferential direction at a connecting portion where the first sipe portion and the second sipe portion are connected with each other. With this structure, it is possible to sufficiently secure the rigidity of the land portion, and therefore sufficiently maintain steering stability.

In the pneumatic tire disclosed herein, it is preferable that, in the first notched portion, depth gradually increases, in a tire width direction, from one end in the tire width direction to the other end in the tire width direction, and depth gradually increases, in a tire circumferential direction, from the other side in a tire circumferential direction to one side thereof. With this structure, it is possible to sufficiently improve drainage performance while sufficiently suppressing the decrease in rigidity of the land portion at the first notched portion.

In the pneumatic tire disclosed herein, it is preferable that, by the at least three main grooves disposed in a tread surface, the first land portion, and the second land portion adjacent to the first land portion with a main groove on the one side in between are defined, and in the second land portion, a second inclined groove, a second notched portion, and a second sipe are disposed point symmetrically to the first inclined groove, the first notched portion and the first sipe. With this structure, it is possible to further improve steering stability and drainage performance.

Advantageous Effect

According to the disclosure, it is possible to provide a pneumatic tire that can improve steering stability and drainage performance.

DETAILED DESCRIPTION

Hereinafter, embodiments of the disclosure will be described with reference to the drawings.

Figure 1:
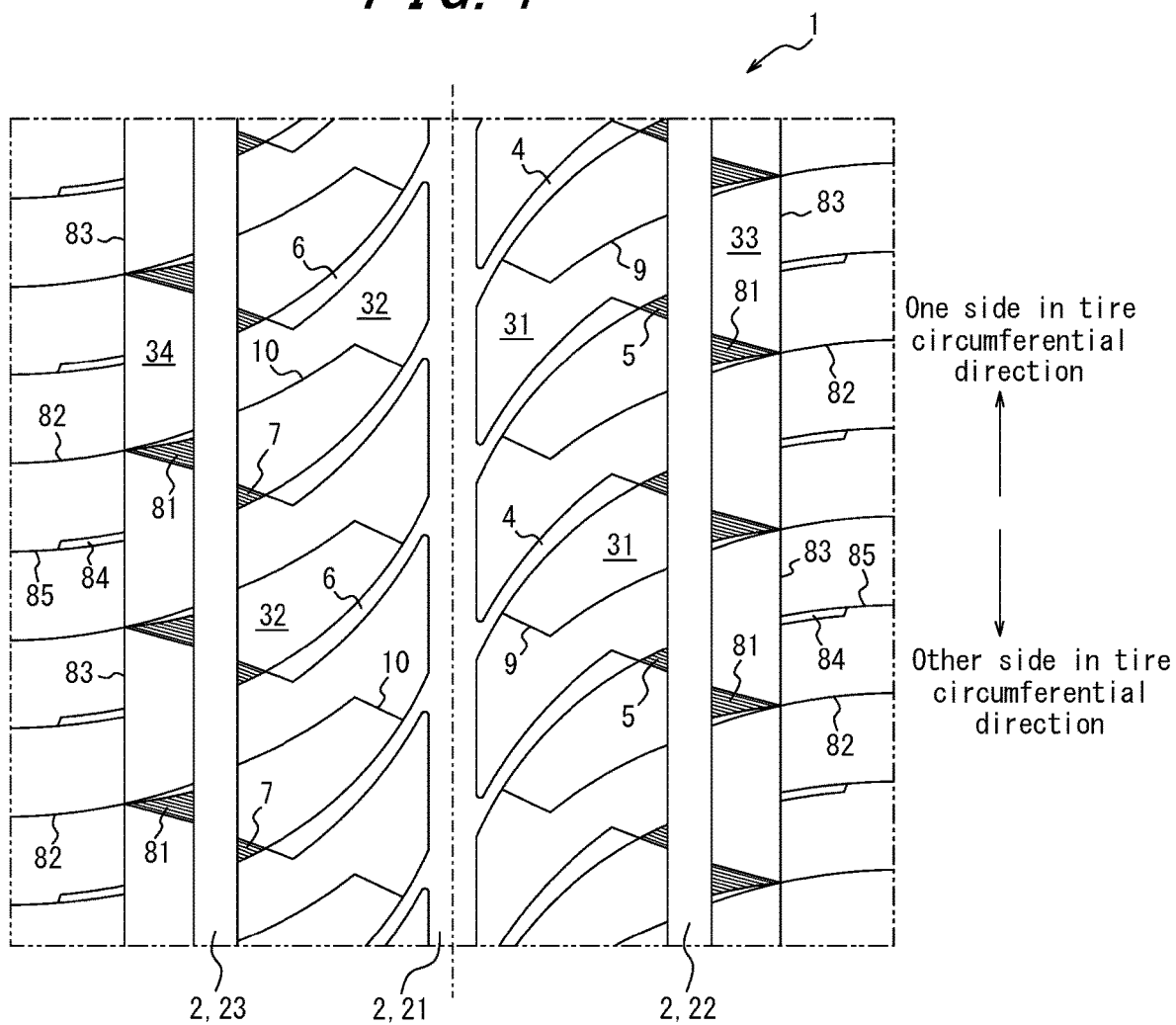
FIG. 1 is a developed view illustrating a tread pattern of a pneumatic tire according to an embodiment of the disclosure.

FIG. 1 is a developed view illustrating a tread pattern of a pneumatic tire 1 according to an embodiment of the disclosure (hereinafter also referred to as "tire"). The tire 1 of the illustrated example is for a light truck, and although omitted in the drawing, the tire 1 is provided with a carcass having a radial structure toroidally extending between bead portions, a belt disposed on a tire radial outer side of the carcass of the tread portion, and a tread rubber disposed on a tire radial outer side of the belt so as to form a tread surface.

As shown in FIG. 1, this tire 1 is provided with, in the tread surface, at least two main grooves 2 continuously extending in the tire circumferential direction, and in the illustrated example, the tire 1 is provided with three main grooves 2. Further, the tire 1 is provided with a rib-like first land portion 31 defined between two main grooves 21, 22 of the main grooves 2 disposed in the tread surface, and in this example, the tire 1 is further provided with a rib-like second land portion 32 adjacent to the first land portion 31, defined between main grooves 21, 23, and shoulder land portions 33, 34 defined between main grooves 22, 23 on the tire widthwise outer side and the tread ground contact end.

Although the main grooves 2 in the illustrated example each have the same widths and are extending linearly in the tire circumferential direction, they may each have different widths or have shapes extending in, for example, a zigzag form or a wavy form. Further, although in the illustrated example, the first land portion 31 and the second land portion 32 have the same land portion widths, they may have different widths. In addition, the number of main grooves and hence the number of land portions may optionally be changed.

Figure 2:
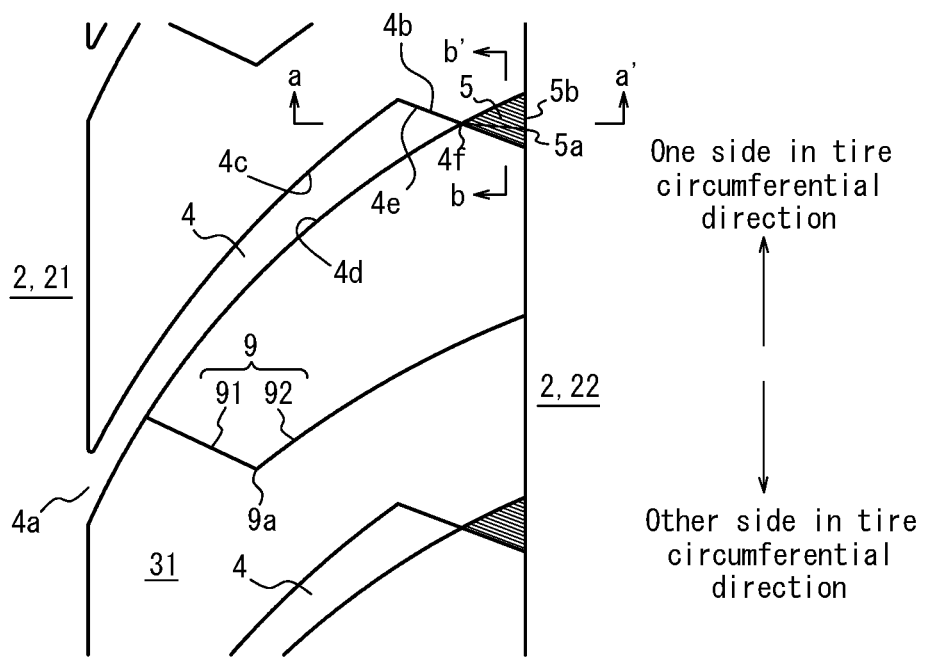
FIG. 2 is an enlarged view illustrating the principal part of the tread pattern illustrated in FIG. 1.

As shown in FIGS. 1 and 2, in the first land portion 31, first inclined grooves 4 inclined relative to the tire width direction and first notched portions 5 as one set are disposed in plural numbers separately from one another in the tire circumferential direction. Further, as shown in FIG. 1, in the second land portion 32, second inclined grooves 6 inclined relative to the tire width direction and second notched portions 7 as one set can be disposed in plural numbers separately in the tire circumferential direction. In addition, on each shoulder land portion 33, 34, shoulder first sipes 82, shoulder second sipes 83 and shoulder third sipes 85 are disposed, the shoulder first sipes 82 opening in main grooves 22, 23 via shoulder notched portions 81 and extending towards the tire widthwise outer side and opening in the tread ground contact end, the shoulder second sipes 83 extending in the tire circumferential direction and intersecting with the shoulder first sipes 82, and the shoulder third sipes 85 being positioned between shoulder first sipes 82 adjacent in the tire circumferential direction, extending from the shoulder second sipes 83 towards the tire widthwise outer side via the narrow groove portions 84 and opening in the tread ground contact end.

As illustrated in the figure, in this tire 1, the tips of the corners formed by each inclined groove, notched portion and sipe may become wear points. Therefore, by performing chamfering or the like, the connections between each inclined groove, notched portion and sipe can be made smooth.

Regarding the first inclined grooves 4 disposed in the first land portions 31, as shown in FIG. 2, one end portion 4a opens in the main groove 21 on one side adjacent to the first land portion 31, and the other end portion 4b terminates within the first land portion 31. Further, regarding the first notched portions 5 disposed in the first land portions 31, one end 5a in the tire width direction as the tip is positioned at an endmost, in the tire width direction, of the other end portion 4b of the first inclined groove 4, and the other end 5b in the tire width direction opens in the main groove 22 on the other side adjacent to the first land portion 31. As used herein, "positioned at an endmost, in the tire width direction, of the other end portion 4b of the first inclined groove 4" in other words means that, of the other end portion 4b of the first inclined groove 4 extending from one end portion 4a toward the other end portion 4b, one end 5a in the tire width direction is positioned at a position most farthest from one end portion 4a in the tire width direction.

According to the pneumatic tire 1 of the present embodiment, the first inclined grooves 4 and the first notched portions 5 are disposed in the first land portions 31, and therefore steering stability and drainage performance can be improved. Specifically, with a tire where inclined grooves which open in each main groove and traverse the land portion are disposed in the first land portions, disposing the inclined grooves carries a risk of a reduction in the rigidity of the land portions and a decrease in steering stability. However, with this tire 1, the first inclined grooves 4 terminate in the first land portions 31, and therefore the rigidity of the first land portions 31 is secured, and steering stability can be improved.

Meanwhile, since the first inclined grooves 4 terminate in the first land portions 31, there is a risk of a decrease in drainage performance. However, with this tire 1, first notched portions 5 are disposed, and therefore it is possible to make the water in the land portion flow in the main groove 2 while suppressing the decrease in rigidity of the land portion. With this structure, drainage performance can be improved.

Regarding the first notched portion 5, it is preferable that the length measured along the tire circumferential direction from one end 5a of the first notched portion 5 toward the other end 5b thereof gradually increases (i.e. the width of the first notched portion 5 gradually increases). With this structure, drainage performance can be improved while suppressing the decrease of rigidity of the land portion at the first notched portion 5.

Regarding the first inclined groove 4, the groove width on the extension line (groove width center line) thereof can be arbitrarily set. However, it is preferable that the groove width of the first inclined groove 4 gradually increases from the side of one end portion 4a thereof toward the side of the other end portion 4b. By setting the groove width of the side of one end portion 4a opening in the main groove 21 to be relatively small and setting the groove width of the side of the other end portion 4b terminating within the first land portion 31 to be relatively large, the land portion rigidity of the side of one end portion 4a and the drainage performance of the side of the other end portion 4b can be improved compared to when the groove width is uniform.

As long as the first inclined groove 4 extends in a manner inclining relative to the tire width direction, the inclination angle thereof is not particularly limited. However, from the viewpoint of braking performance on a wet road surface and a dry road surface, it is preferable that the first inclined groove 4 inclines relative to the tire circumferential direction from one end portion 4a of the first inclined groove 4 to the other end portion 4b in a range of 20° to 60°. The above angle refers to the angle on the acute angle side.

Regarding the first inclined groove 4, it is preferable that the inclination of the first inclined groove 4 relative to the tire width direction is curved in a manner that it gradually decreases from the side of one end portion 4a of the first inclined groove 4 toward the side of the other end portion 4b. With this structure, water introduced from the side of one end portion 4a of the first inclined groove 4 is smoothly discharged from the side of the other end portion 4b, and therefore drainage performance can be further improved.

Regarding the first notched portion 5, one end 5a in the tire width direction as the tip is positioned at a position closest to the side of the other end, in the tire width direction, of the other end portion 4b of the first inclined groove 4, and as shown in FIG. 2, it is preferable that the first notched portion 5 is disposed so that it is not positioned on the extension line of the first inclined groove 4. When the first notched portion 5 is not positioned on the extension line of the first inclined groove 4, the rigidity of the first land portion 31 can be more sufficiently secured compared to when said portion is positioned on the extension line.

The tire circumferential direction in which the first inclined groove is inclined, from the side of one end portion 4a of the first inclined groove 4 toward the side of the other end portion 4b thereof, relative to the tire width direction is referred to as one side in the tire circumferential direction (in the illustrated example, one side in the tire circumferential direction is shown as the upper side, and the other side in the tire circumferential direction is shown as the lower side), and in the illustrated example, each groove side wall 4c, 4d of the first inclined groove 4 extends from the side of one end portion 4a of the first inclined groove 4 toward the side of the other end portion 4b thereof, and in the vicinity of the other end portion 4b of the first inclined groove 4, the groove side wall 4c on one side in the tire circumferential direction terminates more on the side of one end portion 4a of the tire width direction compared to the groove side wall 4d of the other side in the tire circumferential direction. Further, the groove innermost wall 4e forming the other end portion 4b of the first inclined groove 4 is connected with each groove side wall 4c, 4d in a manner inclining relative to the tire circumferential direction, and the connecting point 4f formed by the groove innermost wall 4e and the groove side wall 4d on the other side in the tire circumferential direction is positioned at a position closest to the side of the other end, in the tire width direction, of the other end portion 4b of the first inclined groove 4. Regarding the first notched portion 5, one end 5a as the tip of the first notched portion 5 is positioned at the connecting point 4f of the groove innermost wall 4e and the groove side wall 4d on other side in the tire circumferential direction, and the contour line of the first notched portion 5 is positioned on the extension lines of the groove innermost wall 4e and the groove side wall 4d on the other side in the tire circumferential direction, and therefore the first notched portion 5 has a shape that is not positioned on the extension line of the first inclined groove 4.

Figure 3A:
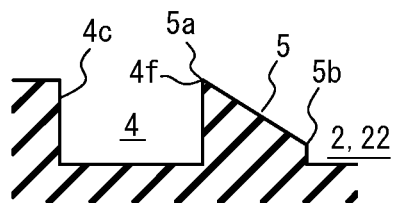
FIG. 3A is an enlarged cross-sectional view along line a-a' of FIG. 2.

As shown in FIG. 3A, in the first notched portion 5, the depth gradually increases from one end 5a to the other end 5b. With this structure, it is possible to sufficiently secure the rigidity of the first land portion 31.

Figure 3B:
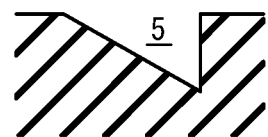
FIG. 3B is an enlarged cross-sectional view along line b-b' of FIG. 2.

Specifically, in the illustrated examples of the first notched portion 5, FIG. 3A shows that, in the tire width direction, the depth gradually increases from one end 5a to the other end 5b, and FIG. 3B shows that, in the tire circumferential direction, the depth gradual increases from the other side in the tire circumferential direction to one side thereof. With this structure, as shown in FIG. 3A, the gradual increase in depth in the tire width direction from the side of one end 5a to the side of the other end 5b enables sufficiently suppressing the decrease of rigidity of the land portion in the first notched portion 5 and sufficiently improving drainage performance. Further, as shown in FIG. 3B, the gradual increase in depth from the other side in the tire circumferential direction to one side thereof enables flowing water smoothly from the other side in the tire circumferential direction to one side in the tire circumferential direction, in drainage from the first inclined groove 4 and the first notched portion 5.

As shown in FIG. 2, this tire 1 is preferably provided with, in the first land portion 31, a first sipe 9 where one end opens in the first inclined groove 4 and the other end opens in the main groove 22 on the other side. Specifically, in the tire 1 of this embodiment, the first sipe 9 is constituted by a first sipe portion 91 on the side of one end of the first sipe 9 and a second sipe portion 92 on the side of the other end of the first sipe 9, the sipe portions having different angles extending relative to the tire circumferential direction (extending angles) and being connected with each other.

Like this, in the first land portion 31, disposing the first sipe 9 between the first inclined grooves 4 and the first notched portions 5 adjacent to each other in the tire circumferential direction enables properly adjusting the rigidity of the block-shaped land portion in the tire circumferential direction so that said land portion equally comes into contact with the ground and said land portion more easily follows the tire deformation when the tire is rolled, and therefore wear resistance performance can be improved. Further, by disposing the first sipe 9, the wiper effect is improved and therefore wet performance can be improved. Regarding the first sipe 9, since one end opens in the first inclined groove 4, it is possible to improve the rigidity of the block-shaped land portion of the first land portion 31 formed by dividing the first land portion 31 into sections with the first sipe 9, compared to when one end is opened in the main groove 21 on one side.

By forming the first sipe 9 with a first sipe portion 91 and a second sipe portion 92, the rigidity of the land portion is more easily adjusted compared to when adopting a sipe with one sipe portion. Further, compared to when adopting a sipe with three or more sipe portions, it is possible to prevent the decrease in rigidity at the connecting portion 9a resulting from the increase in the number of connecting portions 9a connecting each sipe portion.

In the illustrated example, the first sipe 9 is extending from the middle of the first inclined groove 4 to the other side in the tire circumferential direction (from the side of one end portion 4a of the first inclined groove 4 toward the side of the other end portion 4b thereof, in a direction opposite to one side in the tire circumferential direction which is the direction in which the first inclined groove 4 is inclining relative to the tire width direction).

As shown in FIG. 2, regarding the first sipe 9, it is preferable that, the direction in which the first sipe 9 extends is the opposite direction in the tire circumferential direction at the connecting portion 9a where the first sipe portion 91 and the second sipe portion 92 connect with each other. In other words, in the illustrated example, the first sipe portion 91 of the first sipe 9 extends toward the other side in the tire circumferential direction from one end opening in the first inclined groove 4 to the connecting portion 9a, and the second sipe portion 92 of the first sipe 9 extends toward one side in the tire circumferential direction from the connecting portion 9a to the other end where the sipe opens in the main groove 22 on the other side.

With this structure, it is possible to prevent the first inclined groove 4 as well as each corner portion formed by the first sipe portion 91 and the second sipe portion 92 from becoming an extremely acute angle shape, and therefore it is possible to sufficiently secure the rigidity of each corner portion and sufficiently maintain steering stability.

In the illustrated example, the connecting portion 9a of the first sipe portion 91 and the second sipe portion 92 is, in the tire circumferential direction, near the center of the first inclined grooves 4 adjacent to each other in the tire circumferential direction. Further, said connecting portion 9a is positioned at a position in the tire circumferential direction substantially the same as one end portion 4a of the first inclined groove 4, and the second sipe portion 92 is extending approximately in parallel with the first inclined groove 4. In addition, the first sipe portion 91 and the second sipe portion 92 are each inclined relative to the tire circumferential direction in approximately the same angle.

In this embodiment, the second land portion 32 can be provided adjacent to the first land portion 31 with the main groove 21 in between. Further, in the second land portion 32, a second inclined groove 6 inclined relative to the tire width direction, a second notched portion 7, and a second sipe portion 10 can be disposed in plural numbers separately from one another in the tire circumferential direction. Specifically, regarding the second inclined groove 6, similarly to the first land portion 31, one end opens in the main groove 21 on one side adjacent to the second land portion 32 and the other end terminates within the second land portion 32. Regarding the second notched portion 7, one end as the tip is positioned closest to the side of the other end, in the tire width direction, of the other end of the second inclined groove 6, and the other end opens in the main groove 23 on the other side adjacent to the second land portion 32. Regarding the second sipe 10, one end opens in the second inclined groove 6, and the other end opens in the other main groove 23 of the second land portion 32. Further, the second sipe 10 is constituted by a third sipe portion and a forth sipe portion, the sipes having different angles extending relative to the tire circumferential direction and being connected to each other.

In the illustrated example, it is preferable that, in the second land portion 32, the second inclined groove 6, second notched portion 7, and second sipe 10 are disposed point symmetrically to the first inclined groove 4, first notched portion 5 and first sipe 9. With this structure, by disposing a second land portion 32 similar to the first land portion 31, it is possible to further improve steering stability and drainage performance. Further, by making the second land portion 32 point symmetric to the first land portion 31, performances can be achieved regardless of the rotation direction of the tire. In addition, since the first sipe 9 of the first land portion 31 and the second sipe 10 of the second land portion 32 each open in different main grooves 22, 23, water in the land portion is efficiently discharged toward the main groove and drainage performance can be improved.

The foregoing explains embodiments of the disclosure with reference to the drawings. However, the pneumatic tire described herein is not particularly limited to the aforementioned examples, and appropriate changes may be made.

INDUSTRIAL APPLICABILITY

According to the disclosure, it is possible to provide a pneumatic tire that can improve steering stability and drainage performance.

REFERENCE SIGNS LIST

1: Pneumatic tire
2, 21, 22, 23: Main groove
31: First land portion
32: Second land portion
33, 34: Shoulder land portion
4: First inclined groove
4a: One end portion (of first inclined groove)
4b: Other end portion (of first inclined groove)
4c, 4d: Groove side wall (of first inclined groove)
4e: Groove innermost wall (of first inclined groove)
4f: Connecting point (of first inclined groove)
5: First notched portion
5a: One end (of first notched portion)
5b: Other end (of first notched portion)
6: Second inclined groove
7: Second notched portion
81: Shoulder notched portion
82: Shoulder first sipe
83: Shoulder second sipe
84: narrow groove portion
85: Shoulder third sipe
9: First sipe
91: First sipe portion
92: Second sipe portion
9a: Connecting portion (of first sipe portion and second sipe portion)
10: Second sipe

The invention claimed is:

1. A pneumatic tire comprising:
   in a tread surface, two main grooves continuously extending in a tire circumferential direction, the two main grooves including: (i) a center groove having a first groove width, and (ii) a widthwise outer groove positioned outwardly in the tire width direction than the center groove, the widthwise outer groove having a second groove width that is narrower than the first groove width of the center groove; and
   a first land portion defined by the two main grooves, the first land portion including:
   a first inclined groove inclining relative to a tire width direction, and having one end portion opening in in the center groove on one side adjacent to the first land portion and the other end portion terminating within the first land portion, and
   a first notched portion, in a tire width direction, having: (A) one end positioned as a tip at an endmost of the other end portion of the first inclined groove, and (B) the other end of the first notched portion opening in the widthwise outer groove adjacent to the first land portion, wherein
   a groove width of the first inclined groove gradually increases from a side of the one end portion of the first inclined groove toward a side of the other end portion thereof throughout an entirety of the first inclined groove.

2. The pneumatic tire according to claim 1, wherein, in the first notched portion, a length measured along a tire circumferential direction gradually increases from the one end of the first notched portion toward the other end thereof.

3. The pneumatic tire according to claim 1, wherein, in the first inclined groove, inclination of the first inclined groove relative to a tire width direction is curved in a manner that it gradually decreases from a side of the one end portion of the first inclined groove toward a side of the other end portion thereof.

4. The pneumatic tire according to claim 1, wherein
   the first land portion is provided with a first sipe in which one end opens in the first inclined groove and the other end opens in a main groove on the other side, and
   the first sipe is constituted by a first sipe portion and a second sipe portion, the sipe portions having different angles extending relative to a tire circumferential direction and being connected with each other.

5. The pneumatic tire according to claim 4, wherein directions in which the first sipe extends are opposite in a tire circumferential direction at a connecting portion where the first sipe portion and the second sipe portion are connected with each other.

6. The pneumatic tire according to claim 1, wherein, in the first notched portion, depth gradually increases, in a tire width direction, from one end in the tire width direction to the other end in the tire width direction, and depth gradually increases, in a tire circumferential direction, from an other side in a tire circumferential direction to one side thereof.

7. The pneumatic tire according to claim 4, wherein
   by at least three main grooves disposed in a tread surface, the first land portion, and the second land portion adjacent to the first land portion with a main groove on the one side in between are defined, and
   in the second land portion, a second inclined groove, a second notched portion, and a second sipe are disposed point symmetrically to the first inclined groove, the first notched portion and the first sipe.

8. The pneumatic tire according to claim 1, wherein
   a shoulder land portion is defined by a tread edge and the widthwise outer groove; and
   the shoulder land portion has a shoulder notched portion.

9. The pneumatic tire according to claim 8, wherein the first notched portion and the shoulder notched portion are not overlapped when projected in the tire width direction.

10. The pneumatic tire according to claim 8, wherein in a tread plan view, the area of the shoulder notched portion is larger than that of the first notched portion.

* * * * *